United States Patent
Scherrieble et al.

(10) Patent No.: US 7,305,964 B2
(45) Date of Patent: Dec. 11, 2007

(54) METHOD FOR OPERATING AN INTERNAL COMBUSTION ENGINE

(75) Inventors: Michael Scherrieble, Esslingen (DE); Siegfried Weber, Stuttgart (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 11/390,553

(22) Filed: Mar. 24, 2006

(65) Prior Publication Data

US 2006/0201477 A1 Sep. 14, 2006

Related U.S. Application Data

(63) Continuation-in-part of application No. PCT/EP2004/009830, filed on Sep. 3, 2004.

(30) Foreign Application Priority Data

Sep. 25, 2003 (DE) ................ 103 44 423

(51) Int. Cl.
*F02M 7/28* (2006.01)
*F02B 3/00* (2006.01)
(52) U.S. Cl. ............. 123/299; 123/305; 123/435
(58) Field of Classification Search ......... 123/295, 123/299–300, 305, 443, 568.14, 90.15, 345–348, 123/435
See application file for complete search history.

(56) References Cited

U.S. PATENT DOCUMENTS

| | | | |
|---|---|---|---|
| 6,302,080 B1 * | 10/2001 | Kato et al. ............. | 123/295 |
| 6,505,601 B1 * | 1/2003 | Jorach et al. ............ | 123/295 |
| 6,530,361 B1 * | 3/2003 | Shiraishi et al. ......... | 123/435 |
| 6,644,269 B2 * | 11/2003 | Kato et al. .............. | 123/305 |
| 6,688,279 B2 * | 2/2004 | Ishikawa et al. ......... | 123/299 |
| 6,840,211 B2 * | 1/2005 | Takahashi ............... | 123/299 |
| 7,013,861 B1 * | 3/2006 | Hutmacher et al. ...... | 123/276 |
| 7,044,104 B2 * | 5/2006 | Juretzka et al. .......... | 123/299 |
| 7,059,295 B2 * | 6/2006 | Blessing et al. .......... | 123/299 |
| 7,073,479 B2 * | 7/2006 | Kohler et al. ............ | 123/295 |
| 2001/0039935 A1 | 11/2001 | Kato et al. | |
| 2006/0037563 A1 * | 2/2006 | Raab et al. ............. | 123/25 C |
| 2006/0201476 A1 * | 9/2006 | Brachert et al. ......... | 123/299 |

FOREIGN PATENT DOCUMENTS

DE 199 53 932 4/2002

(Continued)

OTHER PUBLICATIONS

Pittermann et al., "Ottomotorische Vorverbrennung Im Dieselmotor?", MTZ Motortechnische Zeitschrift,Stuttgart, DE, vol. 58, No. 1, 1997.

*Primary Examiner*—Hai Huynh
(74) *Attorney, Agent, or Firm*—Klaus J. Bach

(57) ABSTRACT

In a method for operating a self ignition internal combustion engine in which fuel is injected directly into a combustion chamber by means of an injection nozzle, such that a portion of the fuel is injected into the combustion chamber as a pre-injection amount forming a homogenous pre-mixture providing for a combustion phase comprising a low temperature phase and a high temperature phase and the main fuel amount is injected into the combustion chamber during the high temperature phase of the pre-injection fuel combustion such that the ignition of the main injection amount takes place after the start and before the end of the high temperature phase.

7 Claims, 2 Drawing Sheets

FOREIGN PATENT DOCUMENTS

| | | |
|---|---|---|
| DE | 102 13 011 | 10/2003 |
| DE | 102 13 025 | 10/2003 |
| EP | 0 534 491 | 3/1993 |
| EP | 0 838 584 | 4/1998 |
| EP | 1 164 277 | 12/2001 |
| EP | 1 348 854 | 10/2003 |

* cited by examiner

METHOD FOR OPERATING AN INTERNAL COMBUSTION ENGINE

This is a Continuation-In-Part Application of International Patent Application PCT/EP2004/009830 filed Sep. 3, 2004 and claiming the priority of German Application 103 44 423.8 filed Sep. 25, 2003.

BACKGROUND OF THE INVENTION

The invention relates to a method for controlling the combustion of a self ignition internal combustion engine, wherein a first fuel amount is first injected in the combustion chamber and a second amount is then injected for combustion with the mixtures.

In the operation of internal combustion engines with direct fuel injection, attempts are made to influence the combustion and the formation of emissions by varying the injection profile. In particular in direct injection internal combustion engines with self ignition, injection strategies are proposed for optimizing the combustion. These strategies are intended to increase the power while simultaneously reducing the exhaust gas emissions. In this context, a significant increase in power is generally made more difficult by excessive formation of soot particles, in particular in the full load engine operating mode.

DE 19953932 A1 discloses a method with which a combined homogenous/heterogeneous operating mode of an internal combustion engine for achieving medium and relatively high power levels is proposed. In said operating mode, both an early homogenous mixture formation in the compression stroke and a subsequent heterogeneous mixture formation around the top dead center position of the piston are to be made possible with an injection strategy. In this context, the fuel injection takes place during the homogenous mixture formation with a lower injection pressure than during the heterogeneous mixture formation in order to avoid fuel being applied to the cold walls of the combustion chamber. Nevertheless it has become apparent that despite the measures proposed above, the exhaust gas emissions continue to be quite high, in particular in the full load operating mode. For this reason, it is necessary to take further measures with which the exhaust gas emissions are minimized.

It is the principal object of the present invention to provide an internal combustion engine with self ignition with which the load is increased while the exhaust gas emissions are simultaneously reduced.

SUMMARY OF THE INVENTION

In a method for operating a self ignition internal combustion engine in which fuel is injected directly into a combustion chamber by means of an injection nozzle, such that a portion of the fuel is injected into the combustion chamber as a pre-injection amount forming a homogenous pre-mixture providing for a combustion phase comprising a low temperature phase and a high temperature phase and the main fuel amount is injected into the combustion chamber during the high temperature phase of the pre-injection fuel combustion such that the ignition of the main injection amount takes place after the start and before the end of the high temperature phase.

With the ignition of the main injection taking place after the start and before the end of the high temperature phase, a high combustion speed of the main injection fuel amount is achieved, which leads to a reduction in the formation of soot particles while the power is simultaneously increased, in particular in the full load operating range of the engine at high rotational engine speeds.

Since the heterogeneous combustion phase of the main injection starts within the hot flame combustion phase of the preinjection, the main injection quantity is converted more quickly. The more rapid combustion brings about an increase in the combustion speed and avoids a large rise in the exhaust gas temperature.

The method according to the invention is suitable in particular for a full load operating mode, and in particular for a full load operating mode at high rotational speeds, for example at rotational speeds higher than 3000 rpm. Accordingly, the inventive introduction of the main injection into the combustion chamber, in particular in diesel engines with high rotational speeds and a high load, brings about an increase in power while the formation of soot particles is minimized.

In one refinement of the invention, the duration and start of the homogenous combustion phase are closed-loop controlled as a function of the load by changing the preinjection quantity, the compression and/or a temperature of the pre-mixture. As a result, the homogenous combustion phase can be set as a function of the operating point in order to correspondingly carry out a main injection according to the invention, for example during a load change. The temperature of the premixture is preferably changed by an adjustable exhaust gas recirculation rate.

In a further refinement of the invention, the pre-ignition fuel amount is injected into the combustion chamber in a clocked fashion. Accordingly, the preinjection is performed in a plurality of partial quantities, during which process it is possible to vary the number of clock cycles and the injection time of the first partial quantity as a function of the load. As a result, the preinjected fuel components can be homogenized to an optimum degree by the clocked pre-injection so that the fuel jets which are injected first evaporate in the combustion chamber and then mix with air before the next partial quantities follow.

According to a further refinement of the invention, the pre-injection is started in a range from the time when the outlet valve closes to 50° CA before a top dead center position of a piston. The pre-injection is preferably performed in a range from 370° CA to 300° CA before an ignition top dead center or in a range from 140° CA to 50° CA before an ignition top dead center. This prevents the injected fuel from impacting against the walls of the combustion chamber.

Advantages of the invention will become more readily apparent from the following description on the basis of the drawings, wherein exemplary embodiments of the invention are illustrated.

DESCRIPTION OF PREFERRED EMBODIMENTS

A self ignition internal combustion engine has a combustion chamber which is formed between a cylinder head and a piston and which becomes smaller during a compression stroke, during which the air enclosed in it is compressed. Furthermore, the internal combustion engine has a fuel injection device, preferably a common rail fuel injection system, which is controlled by a control device. In such systems, fuel is fed under high pressure to an injection nozzle which is arranged in the cylinder head so that a specific fuel quantity is then metered into the combustion chamber by means of the injection nozzle as a function of the engine load. The injection nozzle preferably has a plurality of injection bores which are distributed over the circumference of the injection nozzle in one or two rows of holes.

The internal combustion engine preferably operates according to the four stroke principle. In a first stroke of a working cycle, the combustion chamber is supplied with combustion air via inlet ducts, while the piston moves downwardly to a bottom dead center position. In a following compression stroke, the piston moves in an upward movement from the bottom dead center position to an ignition top dead center position ZOT. The combustion of the fuel takes place predominantly around the ignition top dead center ZOT. After the combustion, the piston moves downwardly to the bottom dead center position. In a last stroke, the piston moves upwardly to the top dead center position while it expels the exhaust gases from the combustion chamber via outlet ducts. The momentary position of the piston with respect to the cylinder head is determined or defined by a crank angle ° CA with respect to the top dead center position ZOT.

Figure 1:
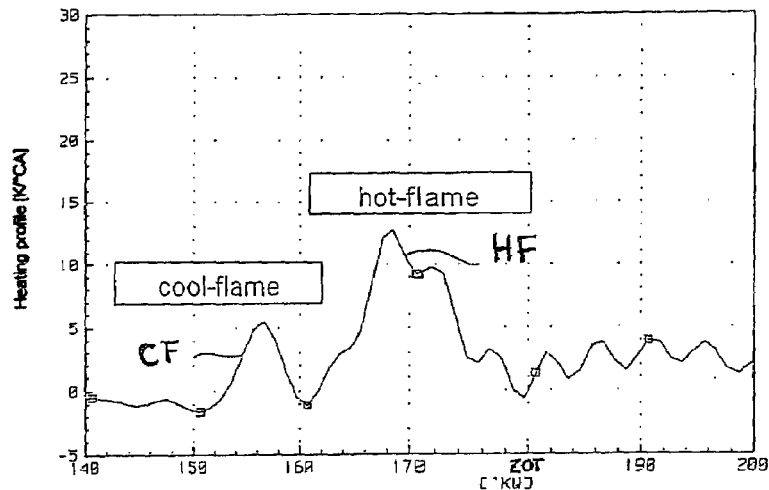
FIG. 1 shows a heating profile of a combustion process of a homogenized fuel/air mixture in a self ignition internal combustion engine.

FIG. 1 illustrates a heating profile of a self ignition internal combustion engine in which a homogenized fuel/air mixture is formed by early fuel injection. The mixture first passes through a low temperature combustion phase, known as the cool flame CF, and a high temperature combustion phase, known as the hot flame HF during combustion.

The present invention is aimed at combining the combustion profile of the homogenous pre-mixture which is shown in FIG. 1 with a selected main injection in such a way that an increase in power is achieved, in particular in the full load operating range. Accordingly, during a working cycle according to the present invention, the entire fuel quantity is divided into a pre-injection and a main fuel injection amount, in particular at high rotational speeds in the full load operating range. During pre-injection a homogenous pre-mixture is formed. As a result, a homogenous combustion phase in the form of a low temperature phase and a high temperature phase according to the combustion profile illustrated in FIG. 1 is initiated.

In the region of the ignition top dead center ZOT, the temperature and pressure rise so strongly that the homogenous mixture begins to burn. The start of injection of the main injection HE is then selected such that the combustion of the main injection HE starts during the homogenously burning pre-injection phase according to FIG. 2 or FIG. 3. After this, the main injection is performed in such a way that its self ignition takes place after the end of the low temperature phase of the pre-injection and preferably during the high temperature phase. The injection time of the main injection is selected such that the injection of the main injection amount lasts until after the end of the low temperature phase that is at least until after the start of the high temperature phase so that the self ignition of the main injection is initiated during the high temperature phase.

The duration of the delay in ignition of the main fuel amount is preferably set both by the injection time of the pre-injection and by the injection time of the main injection or by varying the closing and opening times of the inlet and outlet valves. These times are matched to one another as a function of the load in such a way that the appropriate ignition delay is provided for the injection of the main fuel injection quantity which is associated with the engine operating point.

Figure 2:
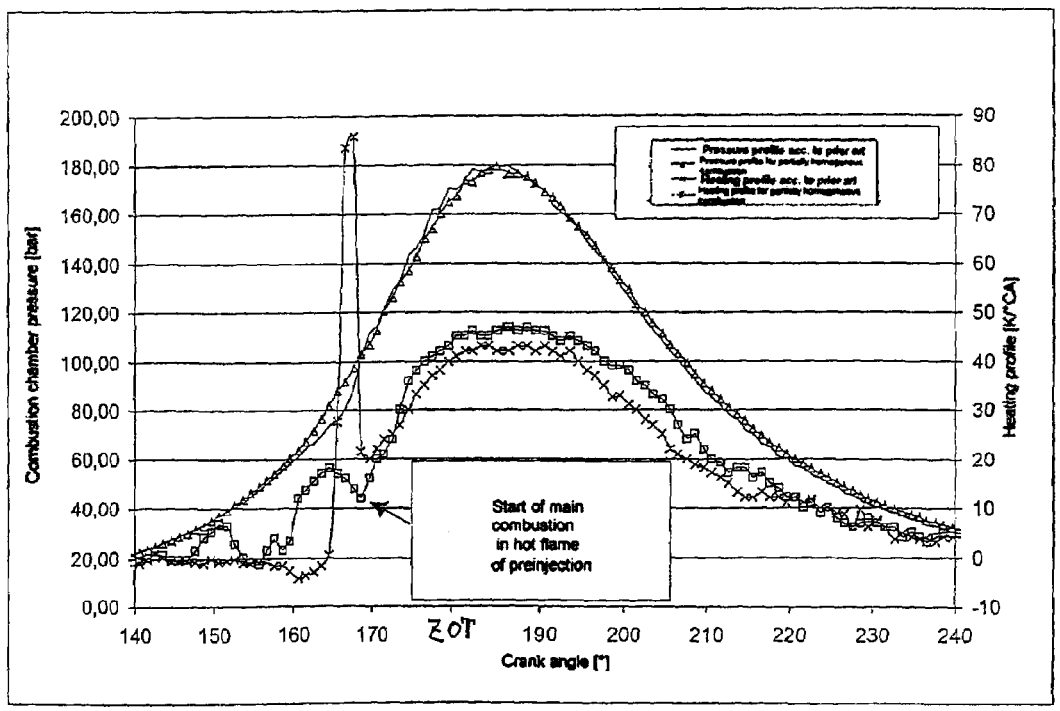
FIG. 2 shows a heating profile of a combustion process according to the invention with preinjection and main injection in a self ignition internal combustion engine.

According to the invention, a relatively high combustion speed is achieved during the combustion of the main injection, which speed leads to a reduction in the formation of soot particles while the engine power is simultaneously increased. This occurs in particular at high rotational speeds in the full load operating range, since the more rapid combustion which is achieved by the method according to the invention provides for an increase in the burning speed. For this reason, the method according to the invention is suitable in particular for a full load operating mode with high rotational speeds. In such a mode increased formation of soot particles is generally expected. The heating profile according to the invention which is illustrated in FIG. 2 exhibits a clear increase in power compared to a conventional combustion process. Here, the main combustion starts just before the hot flame phase HF of the pre-injection.

According to the invention, the time and duration of the injection of fuel and thus the fuel injection quantity can be controlled as a function of the engine load. Precise control is carried out by means of the common rail injection device which permits optimized combustion and thus provides for a higher power yield with a significantly lower emission of pollutants. The common rail injection device makes a plurality of injection processes with different injection quantities per working cycle possible.

Figure 3:
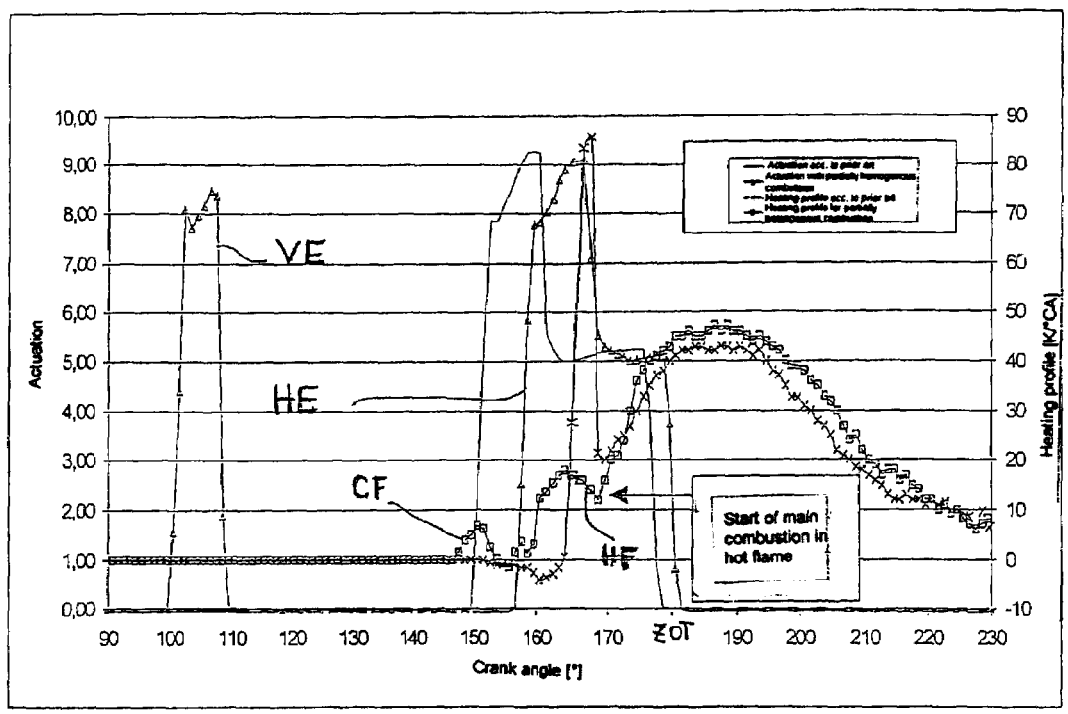
FIG. 3 shows the heating profile of the combustion process according to FIG. 2 and a schematic profile of the injection times of the preinjection and main injection.

FIG. 3 shows the start of the actuation of the injection nozzle. The preinjection VE takes place between 100° CA and 110° CA before the ignition top dead center ZOT, the main injection HE being performed in a range between 155° CA before the ignition top dead center ZOT and approximately 5° CA after the ignition top dead center ZOT.

The pre-injection VE ensures that the pressure in the combustion chamber increases gently. This also reduces the combustion noise which is typical of diesel engines to a minimum. Furthermore, the pre-injection VE, which occurs spontaneously in the vicinity of the ignition top dead center ZOT location and burns homogeneously according to FIG. 1, provides for optimal ignition conditions for the main fuel injection quantities.

FIG. 2 illustrates the combustion chamber pressure for a conventional diesel combustion process without preinjection and with partially homogenous combustion when preinjection VE is performed at 90° CA before the top dead center. Here, the combustion of the pre-injection amount with cool flame CF and hot flame HF can be seen (compare FIG. 1). The main combustion starts in the vicinity of the burning hot flame HF. The heating profile for partially homogenous combustion lies above that of the customary application in wide areas. For the sake of comparison, the heating profile for the application without preinjection is also illustrated in FIG. 2. According to the present invention, an increase in power is achieved with the same peripheral conditions, for example cylinder tip pressure, exhaust gas temperature, charge pressure and charge air temperature. Under these conditions, a fuel/air ratio may be reduced. Despite the lower fuel/air ratio, lower soot emissions are lowered.

The pre-injection VE can preferably be divided into a plurality of relatively small preinjections, i.e. it can be performed in a clocked fashion. A clocked preinjection VE can be performed during a period from the closing of the outlet valve to 50° CA before the ignition top dead center ZOT. In order to prevent the injected fuel from impacting against the wall of the combustion chamber, the preinjection VE can alternatively be performed in a range from 370° CA to 300° CA before the ignition top dead center ZOT or during the compression stroke between 140° CA and 50° CA before the ignition top dead center ZOT.

By selecting an appropriate start of the main injection HE according to FIG. 3, the relatively favorable combustion conditions obtained thereby can be utilized for a more rapid combustion of the main injection HE, which is achieved by the homogenously burning pre-injection VE. As a result of the more rapid combustion, more fuel can be converted, that is more power can be generated without a rise in the exhaust gas temperature.

What is claimed is:

1. A method for operating a self ignition internal combustion engine, said method comprising the steps of:
    injecting fuel directly into a combustion chamber by means of an injection nozzle, such that
    during a working cycle, a portion of the fuel is injected into the combustion chamber as a pre-injection amount, and the rest of the fuel is injected into the combustion chamber at a later time as a main injection amount whereby
    the pre-injection fuel amount forms a homogenous pre-mixture with which
    a homogenous combustion phase is initiated and burns in the a low temperature combustion phase (cold flame combustion) which, with increasing compression, converts to a high temperature combustion phase (hot flame combustion), and injecting the main fuel injection amount into the combustion chamber such that self ignition of the main fuel injection amount takes place before the piston reaches its top dead center position and the main fuel injection amount is combusted after the start, and before the end, of the high temperature combustion phase, that is during hot flame combustion.

2. The method as claimed in claim 1, wherein the duration and start of the homogenous combustion phase are closed-loop controlled as a function of the load by changing at least one of the pre-injection quantity, the compression and a temperature of the pre-mixture.

3. The method as claimed in claim 1, wherein the temperature of the pre-mixture is changed by adjustment of the exhaust gas recirculation rate.

4. The method as claimed in claim 1, wherein the pre-injection fuel amount is injected into the combustion chamber in a clocked fashion.

5. The method as claimed in claim 1, wherein the pre-injection is started in a range from 140° CA to 50° CA before an ignition top dead center.

6. The method as claimed in claim 1, wherein the pre-injection is started in a range from 370° CA to 300° CA before the ignition top dead center.

7. The method as claimed in claim 1, wherein the pre-ignition is started in a range between a time when an outlet valve closes and 50° CA before an ignition top dead center.

* * * * *